United States Patent Office 3,177,230
Patented Apr. 6, 1965

3,177,230
2α-FLUORO-11-OXYGENATED-17α-HYDROXY-4,6-PREGNADIENE-3,20-DIONES
John A. Hogg and Alan H. Nathan, Kalamazoo Township, Kalamazoo County, Mich., assignors to The Upjohn Company, Kalamazoo, Mich., a corporation of Michigan
No Drawing. Filed Sept. 8, 1958, Ser. No. 759,385
17 Claims. (Cl. 260—397.45)

This invention relates to certain novel 2-fluoro steroids and especially 2-fluoro-11β,17α,21-trihydroxy-4,6-pregnadiene-3,20-dione and 21-esters thereof, 2,9α-difluoro-11β,17α,21-trihydroxy-4,6-pregnadiene-3,20-dione and 21-esters thereof, 2-fluoro-17α,21-dihydroxy-4,6-pregnadiene-3,11,20-trione and 21-esters thereof, 2,9α-difluoro-17α,21-dihydroxy-4,6-pregnadiene-3,11,20-trione and 21-esters thereof, 2-fluoro - 11β,17α - dihydroxy - 4,6 - pregnadiene-3,20-dione, 2,9α-difluoro-11β,17α-dihydroxy-4,6-pregnadiene - 3,20 - dione, 2 - fluoro - 17α - hydroxy - 4,6-pregnadiene-3,11,20-trione, 2,9α-difluoro-17α-hydroxy - 4,6-pregnadiene-3,11,20-trione, 2,21-difluoro-11β,17α - dihydroxy-4,6-pregnadiene-3,20-dione, 2,9α,21-trifluoro - 11β,17α-dihydroxy-4,6-pregnadiene-3,20-dione, 2,21-difluoro-17α-hydroxy-4,6-pregnadiene-3,11,20-trione, and 2,9α,21-trifluoro-17α-hydroxy-4,6-pregnadiene-3,11,20-trione, the corresponding 9α-chloro compounds and intermediates in the production thereof, and to processes for their production.

The novel compounds of the present invention and processes for their production may be represented by the following formulae:

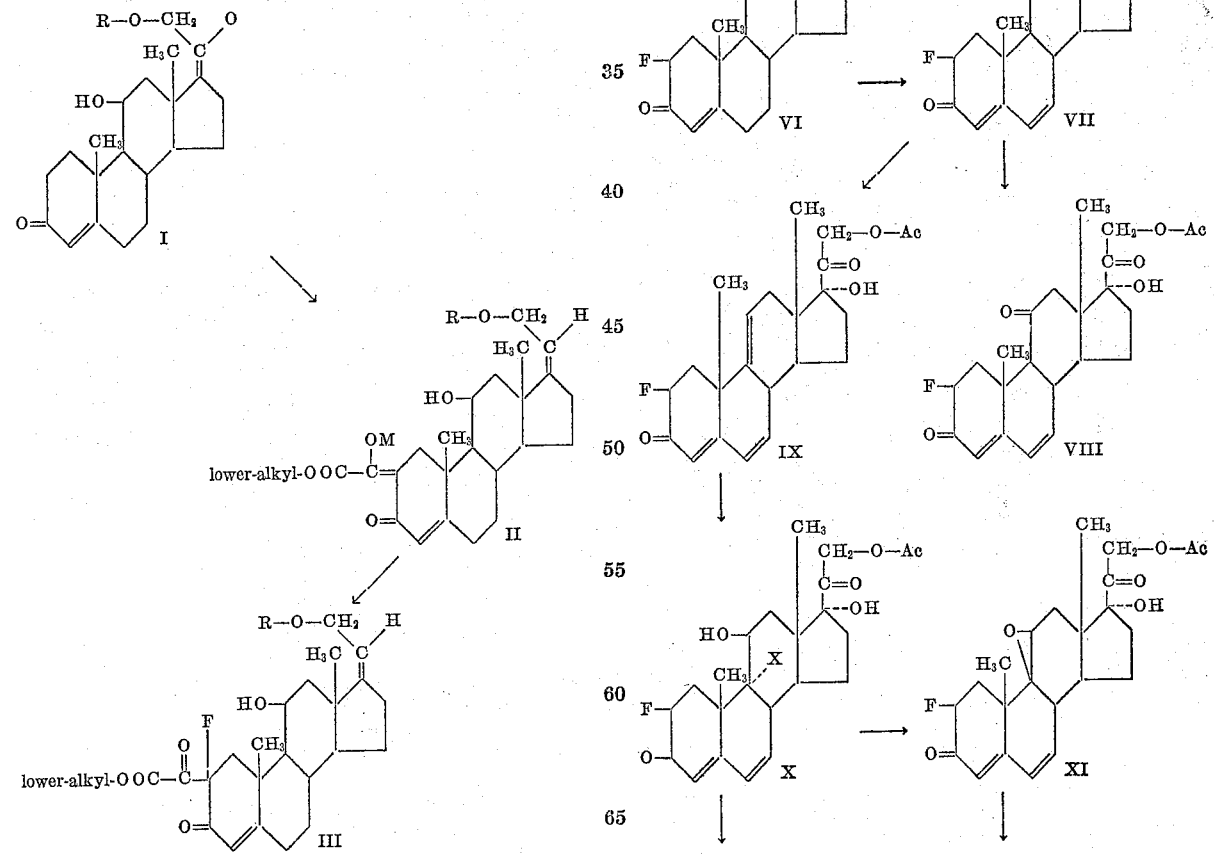

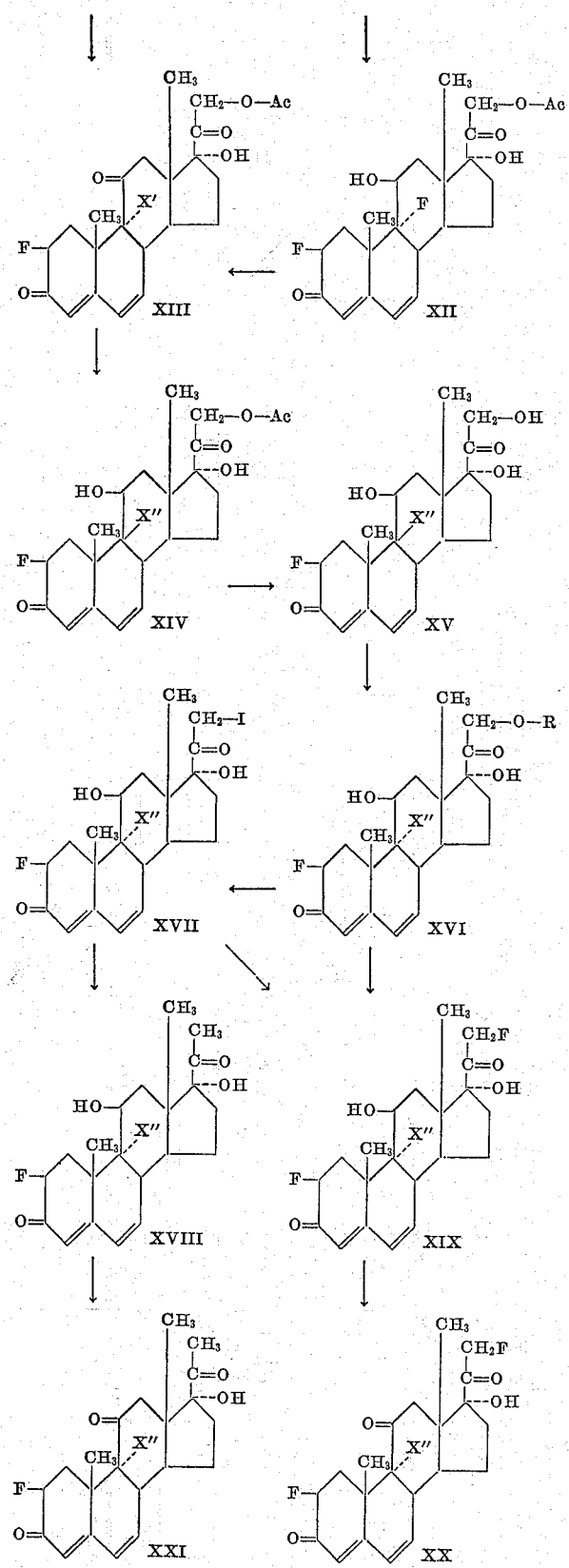

wherein X is a halogen atom having an atomic weight from 35 to 127, inclusive, i.e., chlorine, bromine or iodine; X' is a halogen atom, i.e., fluorine, chlorine, bromine or iodine, preferably fluorine, X" is a hydrogen, chlorine or fluorine atom, M is hydrogen or an alkali-metal, R is hydrogen or the acyl radical of a hydrocarbon carboxylic acid containing from one to twelve carbon atoms, inclusive, and R' is a sulfonyl radical, preferably that of a hydrocarbon sulfonic acid containing from one to twelve carbon atoms, inclusive, e.g., lower alkyl, methyl, aryl, phenyl, p-tolyl, sym.-xylyl-sulfonic acid. The 2-fluorine atom has the alpha stereoconfiguration.

The novel 2-fluoro-11β,17α,21-trihydroxy-4,6-pregnadiene-3,20-dione and 21-esters thereof are prepared by the following reactions: 11β,21-dihydroxy-4,17(20)-[cis]-pregnadien-3-one (I, R=H), [Hogg et al., J. Am. Chem. Soc., 77, 4436 (1955)] is reacted with a dialkyl oxalate, preferably methyl or ethyl oxalate in the presence of an alkali-metal lower-alkoxide, preferably sodium methoxide, sodium ethoxide or potassium tertiary butoxide, in a solvent nonreactive under the reaction conditions, e.g., tertiary butyl alcohol, to produce an alkali-metal enolate of 2-alkoxyoxalyl-11β,21-dihydroxy-4,17(20)-[cis]-pregnadien-3-one (II, M=alkali-metal). This compound or the corresponding free enol (II, M=H) is then reacted with perchloryl fluoride (ClO₃F) to produce 2-fluoro-2-alkoxyoxalyl-11β,21-dihydroxy - 4,17(20) - [cis]-pregnadien-3-one (III). Treatment of this compound with base, e.g., methanolic sodium methoxide, is productive of 2-fluoro-11β,21-dihydroxy - 4,17(20) - [cis] - pregnadien-3-one (IV). Fluorination with perchloryl fluoride introduces the fluorine atom in the alpha position. Thus, the 2-fluorine atom of all of the compounds of this invention has the alpha stereoconfiguration. Alternatively, starting with a 21-ester of 11β,21-dihydroxy-4,17(20)-[cis]-pregnadien-3-one (I, R=Ac), preferably the acetate, the corresponding 2-alkoxyoxalyl compound (II, R=Ac) and the 2-fluoro-2-alkoxyoxalyl compound (III, R=Ac) are produced. Removal of the 2-alkoxyoxalyl group results in at least partial hydrolysis of the 21-ester group so that the 2-fluoro-21-hydroxy compound (IV, R=H) results. Esterification of this compound, preferably with acetic anhydride re-introduces the 21-ester group (V). The oxidative hydroxylation of these compounds, preferably V, according to one of the methods described in U.S. Patents 2,769,825, 2,769,823 or in Hogg et al., J. Am. Chem. Soc., 77, 4436 (1955), is productive of 2-fluoro-11β,17α,21-trihydroxy-4-pregnene-3,20 - dione 21-acylate, preferably the 21-acetate (VI). This compound is then dehydrogenated with chloranil or similar dehydrogenating agent to produce 2-fluoro-11β,17α,21-trihydroxy-4,6-pregnadiene-3,20-dione 21-acylate (VII), which can be hydrolyzed with base to produce 2-fluoro-11β,17α,21-trihydroxy-4,6-pregnadiene-3,20-dione (XV, X"=H) or oxidized with an oxidizing agent, e.g., chromic acid or a N-haloacylamide, e.g., N-bromoacetamide, or a N-haloimide, e.g., N-chlorosuccinimide, in pyridine or other like amine, to produce the corresponding ester of 2-fluoro-17α,21-dihydroxy-4,6-pregnadiene-3,11,20 - trione (VIII), which, in turn, is hydrolyzed as described above to 2-fluoro-17α,21-dihydroxy-4-pregnene-3,11,20-trione.

The 2-fluoro-9α-halo compounds of the present invention are prepared as follows: dehydrating a 2-fluoro-11β,17α,21-trihydroxy-4,6-pregnadiene - 3,20 - dione 21-acylate (VII), illustratively with sulfuric acid or preferably with a hypohalous acid followed by anhydrous sulfur dioxide, produced the corresponding 2-fluoro-17α,21-dihydroxy-4,6,9(11)-pregnatriene-3,20-dione 21-acylate (IX). Addition of a hypohalous acid, i.e., hypochlorous, hypoiodous or hypobromous acid, to this latter compound produces the corresponding 2-fluoro-9α-halo-11β,17α,21-trihydroxy-4,6-pregnadiene-3,20 - dione 21-acylate (X), which by treatment with a base, e.g., anhydrous potassium acetate, yields the corresponding epoxy compound (XI), e.g., 2-fluoro-9β,11β-epoxy-17α,21-dihydroxy-4,6-pregnadiene-3,20-dione 21-acylate. Treatment of this epoxy compound with hydrogen fluoride or other hydrogen fluoride releasing agents produces the highly active 2,9α-difluoro-11β,17α,21-trihydroxy - 4,6 - pregnadiene-3,20-dione 21-acylate (XII). Oxidation of this latter compound, preferably the 21-acetate, with chromic acid in acetic acid provides 2,9α-difluoro-17α,21-dihydroxy-4,6-pregnadiene-3,11,20-trione 21-acylate (XIII). Hydrolysis of the ester XIII with a base provides the free alcohol 2,9α-difluoro-17α,21-dihydroxy-4,6-pregnadiene - 3,11,20-trione.

The 2,21-difluoro compounds of the present invention are prepared by treating 2-fluoro-11β,17α,21-trihydroxy-4,6-pregnadiene-3,20-dione, the corresponding 11-keto compound or their 9α-chloro or fluoro analogues (XV) with an organic sulfonyl halide such as methanesulfonyl chloride, toluene-sulfonyl chloride, toluenesulfonyl bromide, benzenesulfonyl chloride, naphthalenesulfonyl chloride, etc., to obtain the corresponding 21-sulfonate ester (XVI), e.g., 2-fluoro-11β,17α,21-trihydroxy-4,6-pregnadiene-3,20-dione 21-methylsulfonate or 21-p-toluenesulfonate, treating the thus-produced 21-alkyl or aryl sulfonate with sodium iodide in acetone solution to obtain the corresponding 21-iodo compound, e.g., 2-fluoro-11β,17α-dihydroxy 21-iodo-4,6-pregnadiene-3,20 - dione (XVI); treating the thus-obtained 21-iodo compound with silver fluoride, preferably in acetonitrile solution to obtain the corresponding 21-fluoro compound, e.g., 2,21-difluoro-11β,17α-dihydroxy-4,6-pregnadiene - 3,20 - dione (XIX); and if desired oxidizing the thus-obtained 21-fluoro compound with chromic anhydride, N-bromoacetamide, N-bromosuccinimide, or the like, to give the corresponding 11-keto compound, e.g., 2,21-difluoro-17α-hydroxy - 4,6 - pregnadiene - 3,11,20 - trione (XX). Alternatively, the 21-sulfonate, preferably the 21-methylsulfonate, can be treated directly with potassium fluoride in dimethyl sulfoxide, e.g., at 100 degrees for eighteen hours or longer, to produce 2,21-difluoro-11β,17α-dihydroxy-4,6-pregnadiene-3,20-dione directly. The 11-keto analogues of these compounds are similarly converted from their 21-sulfonate ester directly to the 21-fluoro compounds.

The 21-unsubstituted compounds of the present invention (XVIII, XXI), e.g., 2-fluoro-11β,17α-dihydroxy-4,6-pregnadiene-3,20-dione, are prepared by treating a 21-iodo compound (XVII), e.g., 2-fluoro-11β,17α-dihydroxy-21-iodo-4,6-pregnadiene-3,20-dione with a reducing agent such as sodium thiosulfate, sodium bisulfite, potassium bisulfite, or the like, in an aqueous organic solvent mixture to obtain the corresponding 21-unsubstituted compound (XVIII) and if desired oxidizing the thus-obtained 2-fluoro-11β,17α-dihydroxy-4,6-pregnadiene-3,20 - dione with chromic anhydride, N-bromoacetamide, N-bromosuccinimide, or the like, to give the corresponding 11-keto compound (XXI), e.g., 2-fluoro-17α-hydroxy-4,6-pregnadiene-3,11,20-trione. The 9α-chloro and 9α-fluoro-21-unsubstituted compounds (XVIII, XXI, X″=Cl, F) are prepared by substituting the corresponding 9α-halo-21-iodo compounds (XVII, X″=Cl, F) as starting compounds in the above-described reaction.

It is an object of this invention to provide the novel 2-fluoro-11β,17α,21-trihydroxy-4,6-pregnadiene-3,20 - dione and 21-esters thereof, 2,9α-difluoro-11β,17α,21-trihydroxy-4,6-pregnadiene-3,20-dione, esters thereof and the corresponding 9α-bromo, 9α-iodo and 9α-chloro compounds that are intermediates in the production of the 9α-fluoro compound, as well as the 9(11)-dehydro and 9β,11β-epoxy intermediates in the production of the 9α-fluoro compound, 2-fluoro-17α,21-dihydroxy-4,6 - pregnadiene-3,11,20-trione and 21-esters thereof, 2,9α-difluoro-17α,21-dihydroxy-4,6-pregnadiene-3,11,20 - trione and 21-esters thereof, as well as the corresponding 9α-chloro, 9α-bromo and 9α-iodo compounds, 2-fluoro-11β,17α-dihydroxy-4,6-pregnadiene-3,20-dione, 2,9α-difluoro-11β,17α-dihydroxy-4,6-pregnadiene-3,20-dione and intermediates in the production thereof, 2-fluoro-17α-hydroxy-4,6-pregnadiene-3,11,20-trione, 2,9α - difluoro-17α-hydroxy-4,6-pregnadiene-3,11,20-trione, 2,9α-difluoro-17α-hydroxy - 4,6 - pregnadiene-3,11,20-trione, 2,21-difluoro-11β,17α-dihydroxy-4,6-pregnadiene - 3,20 - dione, 2,9α,21-trifluoro-11β,17α-dihydroxy - 4,6 - pregnadiene-3,20-dione, and intermediates in the production thereof, 2,21-difluoro-17α-hydroxy-4,6-pregnadiene-3,11,20-trione, 2,9α,21-trifluoro-17α-hydroxy-4,6-pregnadiene-3,11,20-trione and intermediates in the production thereof. It is another object to provide processes for the production thereof and pharmaceutical preparations and mixtures thereof. Other objects will be apparent to those skilled in the art to which this invention pertains.

The novel 2-fluoro compounds of this invention (VII–XXI) possess a high order of physiological activities, and possess activity spectra different from the adrenocortical hormones found in nature such as hydrocortisone and cortisone or other known compounds without the 2-halo group especially in their effect on mineral and water-metabolism. These compounds, especially VII, VIII, XII, XIII, XV, XVIII, XIX, XX and XXI, possess useful anti-inflammatory activity. These compounds cause less salt and water retention than the corresponding analogues without the 2-fluoro group, which makes them especially valuable in the management of inflammatory conditions concurrent with chronic congestive heart failure, of cirrhosis of the liver, the nephrotic syndrome and eclampsia and preeclampsia.

The novel 2-fluoro compounds of this invention are useful in oral, parenteral and topical compositions. In oral compositions the material may be given as tablets illustratively using either polyethylene glycol 4000 or 6000 as a carrier or lactose and/or sucrose as a diluent. They are useful for topical application as ointments, lotions, jellies, creams, suppositories, bougies, aqueous suspensions, etc.

Incorporation of an antibiotic into the pharmaceutical composition, especially neomycin sulfate, has therapeutic advantages each active ingredient potentiating and supplementing the useful properties of the other. In place of, or in addition to, neomycin sulfate, other antibiotics such as novobiocin, bacitracin, circulin, polymyxin B sulfate, gramicidin, streptomycin sulfate, dihydrostreptomycin sulfate, oxytetracycline, chlortetracycline, tetracycline, chloramphenicol and the sulfonamides can be used in conjunction with the steroids of the present invention for preparations such as the above ointments.

The following preparations and examples are illustrative of the process and products of the present invention, but are not to be construed as limiting.

PREPARATION 1

*2-fluoro-11β,21-dihydroxy-4,17(20)-[cis]-pregnadien-3-one*

A solution of 7.45 grams of 11β,21-dihydroxy-4,71(20)-[cis]-pregnadien-3-one 21-acetate [Hogg et al., J. Am. Chem. Soc., 77, 4436 (1955)], in 100 milliliters of tertiary butyl alcohol was stirred and heated to 65 degrees centigrade under a nitrogen atmosphere. Heating was stopped and 5.45 milliliters of ethyl oxalate and 6.57 milliliters of a methanol solution containing 1.62 grams of sodium methoxide was added. After stirring for one-half hour, 100 milliliters of ether was added. The yellow precipitate was collected, washed with ether and dried. There was obtained 10.60 grams.

The precipitate was dissolved in 150 milliliters of methanol and the solution cooled to zero degrees centigrade. Gaseous perchloryl fluoride ($ClO_3F$) was passed in at a rate slow enough to keep the temperature below five degrees centigrade. 3.2 times the theoretical amount of perchloryl fluoride was added and the excess was then destroyed with an equivalent weight of sodium methoxide in methanol. After stirring for fifteen minutes, the solution was poured into about 700 milliliters of ice water. The white solid that precipitated was collected, washed thoroughly with water and then dried in a vacuum oven at fifty degrees centigrade. There was obtained 6.08 grams which was dissolved in hexane hydrocarbons (Skellysolve B) and poured over a sixty gram column of magnesium silicate (Florisil). The column was developed with hexane hydracorbons containing increasing proportions of acetone. Hexanes plus seven percent acetone eluted 0.077 gram of 2-fluoro-11β,21-dihydroxy-4,17(20)-[cis]-pregnadien-3-one 21-acetate, melting at 163 to 169 degrees centigrade and hexanes plus twenty percent acetone eluted 2.76 grams of 2-fluoro-11β-21-dihydroxy-4,17(20)[cis]-pregnadien-3-one melting at 176.5 to 178.5 degrees centigrade, having an $[\alpha]_D$ of plus 195 degrees ($CHCl_3$), a $\lambda_{max}$ of 241.5 m$\mu$, $a_M$ 13,850 and the analysis below.

Calculated for $C_{21}H_{29}FO_3$: C, 72.38; H, 8.39; F, 5.45. Found: C, 72.49; H, 8.21; F, 5.35.

PREPARATION 2

2-fluoro-11β,21-dihydroxy-4,17(20)-[cis]-pregnadien-3-one 21-acetate

A solution of 7.45 grams (0.02 mole) of 11β,21-dihydroxy-4,17(20)-[cis]-pregnadien-3-one 21-acetate in 100 milliliters of dry tertiary butyl alcohol was mixed in a nitrogen atmosphere at 65 degrees centigrade with 5.85 grams of ethyl oxalate and 5.15 grams of methanolic solution containing 1.35 grams of sodium methoxide. The stirred mixture was maintained at this temperature and under nitrogen atmosphere for one-half hour.

To the resulting solution was added 0.60 gram of glacial acetic acid, thus producing the free enolate, followed by 2.48 grams of anhydrous sodium acetate in 170 milliliters of methanol. The clear orange solution that resulted was cooled to zero degrees centigrade and kept in an ice bath while perchloryl fluoride ($ClO_3F$) gas was bubbled into the solution. The color of the solution gradually faded and after about 45 minutes it reached its lightest hue.

A methanolic solution containing 1.39 grams of sodium methoxide was then added to the resulting solution and stirring was continued at room temperature for one hour. The solution was poured into one liter of ice water, precipitating 6.92 grams of 2-fluoro-11β,21-dihydroxy-4,17(20)-[cis]-pregnadien-3-one melting at 124 to 127 degrees centigrade.

The dried product was left standing overnight in a mixture of fifty milliliters each of acetic anhydride and pyridine and was then poured into ice water. The precipitated product was extracted with 500 milliliters of methylene chloride which was dried and then poured over a chromatographic column of 280 grams of magnesium silicate (Florisil). The column was developed with 500-milliliter fractions of solvent of the following composition and order: Four fractions of hexane hydrocarbons (Skellysolve B) plus seven percent acetone, six of hexanes plus ten percent acetone, six of hexanes plus fifteen percent acetone and one of acetone. The residues from fractions five to nine (not counting the methylene chloride) were combined and recrystallized once from acetone and once from 95 percent ethanol. There was obtained 2 - fluoro-11β,21-dihydroxy-4,17(20)-[cis]-pregnadien-3-one 21-acetate melting at 199 to 201 degrees centigrade, $[\alpha]_D$ plus 185 degrees ($CHCl_3$), $\lambda_{max}$ 241 m$\mu$, $a_M$ 14,775. Infrared and ultraviolet spectrum analysis were consistent with the structure.

Calculated for $C_{23}H_{31}FO_4$: C, 70.74; H, 8.00; F, 4.87. Found: C, 70.95; H, 8.00; F, 4.61.

PREPARATION 3

2-fluoro-11β,17α,21-trihydroxy-4-pregnene-3,20-dione 21-acetate

A solution of 0.503 gram of 2-fluoro-11β,21-dihydroxy-4,17(20)-[cis]-pregnadien-3-one 21-acetate in 6.5 milliliters of tertiary butyl alcohol, 0.64 milliliter of pyridine and two milliliters of methylene chloride was mixed with 1.58 milligrams of osmium tetroxide and 600 milligrams of N-methylmorpholine oxide peroxide (U.S. Patent 2,769,823) in tertiary butyl alcohol and then stirred for seventeen hours at room temperature. One-tenth gram of filter aid (Magnesol) and two milliliters of a one percent aqueous sodium hydrosulfite solution was added and the mixture filtered, diluted with water and extracted with ether. The ether solution was washed with water, dilute hydrochloric acid and an aqueous sodium chloride solution, dried over sodium sulfate and the solvent then evaporated. The 0.48 gram of residual oil was dissolved in hexane hydrocarbons and chromatographed over a 35-gram column of magnesium silicate (Florisil). The desired product was eluted with fifteen and twenty percent acetone in hexanes (Skellysolve B). The 0.351 gram of 2-fluoro-11β,17α,21-trihydroxy-4-pregnene-3,20-dione 21-acetate thus obtained melted, after recrystallization from a mixture of ethyl acetate and hexanes, at 194 to 199 degrees centigrade, had an $[\alpha]_D$ of plus 172 degrees ($CHCl_3$), a $\lambda_{max}$ of 243 m$\mu$, $a_M$ 14,875 and the analysis below.

Calculated for $C_{23}H_{31}O_6F$: C, 65.38; H, 7.40; F, 4.50. Found: C, 65.68; H, 7.85; F, 3.97.

EXAMPLE 1

2-fluoro-11β,17α,21-trihydoxy-4,6-pregnadiene-3,20-dione 21-acetate

A mixture of 0.5 gram of 2-fluoro-11β,17α,21-trihydroxy-4-pregnene-3,20-dione 21-acetate and 0.75 gram of recrystallized chloranil in thirty milliliters of tertiary amyl alcohol was heated at its boiling point for four hours. The solvent was then removed with a current of air while heating on a steam bath, the residue mixed with methylene chloride and the insoluble chloranil removed by filtration. The filtrate was washed with a cold aqueous two percent sodium hydroxide solution, water and then dried and the solvent evaporated. The residual gum was crystallized from a mixture of acetone and hexane hydrocarbons (Skellysolve B) to give 2-fluoro-11β,17α,21-trihydroxy-4,6-pregnadiene-3,20-dione 21-acetate melting at 180 to 195 degrees centigrade. Recrystallization from a mixture of ethyl acetate and hexane hydrocarbons gave 0.3 gram of the same product melting at 199 to 203 degrees centigrade, having an $[\alpha]_D$ of plus 249 degrees in chloroform, a $\lambda_{max}$ of 285 m$\mu$, $a_M$ 23,900 and the analysis below.

Calculated for $C_{23}H_{29}FO_6$: C, 65.70; H, 6.95; F, 4.52. Found: C, 65.57; H, 7.12; F, 4.06.

EXAMPLE 2

2-fluoro-17α,21-dihydroxy-4,6-pregnadiene-3,11,20-trione 21-acetate

A solution of 0.245 gram of 2-fluoro-11β,17α,21-trihydroxy-4,6-pregnadiene-3,20-dione in 3.0 milliliters of glacial acetic acid was treated with 0.17 gram of potassium dichromate in about 0.5 milliliter of water. The solution was maintained at room temperature for three hours and then poured into about fifty milliliters of water. The precipitated product was extracted with methylene chloride. The resulting extract was washed with water, dried over sodium sulfate and the solvent then removed by evaporation. There was obtained 0.23 gram of 2-fluoro-17α,21-dihydroxy-4,6-pregnadiene-3,11,20-trione 21-acetate melting at 202 to 208 degrees centigrade. A sample recrystallized from a mixture of acetone and hexane hydrocarbons and then from a mixture of ethyl acetate and hexane hydrocarbons melted at 221 to 222 degrees centigrade and had the analysis below.

Calculated for $C_{23}H_{27}FO_6$: C, 66.01; H, 6.51; F, 4.54. Found: C, 65.60; H, 6.74; F, 4.8.

EXAMPLE 3

2-fluoro-11β,17α,21-trihydroxy-4,6-pregnadiene-3,20-dione

A solution of 438 milligrams of 2-fluoro-11β,17α,21-trihydroxy-4,6-pregnadiene-3,20-dione 21-acetate in four milliliters of methanol was freed of oxygen by bubbling nitrogen therethrough. A solution of 404 milligrams of potassium bicarbonate in four milliliters of water was similarly freed of oxygen. The two solutions were mixed at a temperature of between eighteen and twenty degrees centigrade and in a nitrogen atmosphere. The mixture was stirred at room temperature for five hours while protecting it from atmospheric oxygen with nitrogen. At the end of this time the solution was neutralized with glacial acetic acid. The neutral solution was concentrated by distillation at room temperature and reduced pressure and then chilled in a refrigerator for sixteen hours. The precipitated 2-fluoro-11β,17α,21-trihydroxy-4,6-pregnadiene-3,20-dione was filtered and dried.

EXAMPLE 4

*2-fluoro-17α,21-dihydroxy-4,6-pregnadiene-3,11,20-trione*

Following the procedure of Example 3, 2-fluoro-17α, 21-dihydroxy-4,6-pregnadiene-3,11,20-trione 21-acetate was hydrolyzed to 2-fluoro-17α,21-dihydroxy-4,6-pregnadiene-3,11,20-trione.

EXAMPLE 5

*2-fluoro-17α,21-dihydroxy-4,6,9(11)-pregnatriene-3,20-dione 21-acetate*

To a solution of 530 milligrams of 2-fluoro-11β,17α,21-trihydroxy-4,6-pregnadiene-3,20-dione 21-acetate in five milliliters of pyridine, in a nitrogen atmosphere, was added 225 milligrams of N-bromoacetamide. After standing at room temperature under nitrogen for a period of thirty minutes, the reaction solution was cooled to ten to fifteen degrees centigrade and, with shaking, sulfur dioxide gas was passed over the surface until the solution gave no color with acidified starch-iodide paper. During the addition of sulfur dioxide gas, the reaction became warm. The temperature was kept under thirty degrees centigrade by external cooling and by varying the rate of sulfur dioxide addition. After standing at room temperature for a period of fifteen minutes, the reaction mixture was poured into thirty milliliters of ice water and the resulting gummy precipitate extracted with fifty milliliters of ether. The ether extract was washed with five percent hydrochloric acid solution and water, dried over anhydrous sodium sulfate, and evaporated to dryness to give 2 - fluoro - 17α,21dihydroxy-4,6,9(11)-pregnatriene-3,20-dione 21-acetate.

EXAMPLE 6

*2-fluoro-9α-bromo-11β,17α,21-trihydroxy-4,6-pregnadiene-3,20-dione 21-acetate*

To a solution of 332 milligrams of 2-fluoro-17α,21-dihydroxy-4,6,9(11)-pregnatriene-3,20-dione 21-acetate in five milliliters of methylene chloride and 9.9 milliliters of tertiary butyl alcohol was added a solution of 83 milliliters of 72 percent perchloric acid in 5.8 milliliters of water followed by a solution of 142 milligrams of N-bromo-acetamide in 2.5 milliliters of tertiary butyl alcohol. After stirring the reaction mixture for fifteen minutes, a solution of 142 milligrams of sodium sulfite in seven milliliters of water was added and the reaction mixture was concentrated to a volume of about 25 milliliters under reduced pressure at about sixty degrees centigrade. The concentrate was cooled in an ice bath while stirring and 35 milliliters of water was added. After stirring for a period of twenty minutes, the crystalline product was isolated by filtration, the crystals were washed with water and air-dried to give 2-fluoro-9α-bromo-11β,17α,21-trihydroxy-4,6-pregnadiene-3,20-dione 21-acetate.

EXAMPLE 7

*2-fluoro-9β,11β-epoxy-17α,21-dihydroxy-4,6-pregnadiene-3,20-dione 21-acetate*

To a solution of 406 milligrams of 2-fluoro-9α-bromo-11β,17α,21-trihydroxy-4,6-pregnadiene-3,20-dione 21-acetate in fifteen milliliters of acetone was added 406 milligrams of potassium acetate and the resulting suspension was heated under reflux for a period of eighteen hours. The mixture was then concentrated to five milliliters of volume on the steam bath and thereupon ten milliliters of water was added. The product was separated by filtration and recrystallized from acetone to give 2-fluoro-9β,11β - epoxy-17α,21-dihydroxy-4,6-pregnadiene-3,20-dione 21-acetate.

EXAMPLE 8

*2,9α-difluoro-11β,17α,21-trihydroxy-4,6-pregnadiene-3,20-dione 21-acetate*

To a solution of 230 milligrams of 2-fluoro-9β,11β-epoxy - 17α,21-dihydroxy-4,6-pregnadiene-3,20-dione 21-acetate in five milliliters of methylene chloride was added 1.2 milliliters of a 48 percent aqueous solution of hydrogen fluoride. The two-phase mixture was stirred for a period of twenty hours, then diluted with fifteen milliliters of methylene chloride and carefully poured into forty milliliters of water containing four grams of sodium bicarbonate. After shaking to neutralize the excess hydrogen fluoride, the methylene chloride was separated and the water phase was extracted with more methylene chloride. The combined methylene chloride solution was dried over anhydrous sodium sulfate, diluted with 25 milliliters of ether and chromatographed over twenty grams of magnesium silicate (Florisil). The column was eluted with hexanes (Skellysolve B) containing increasing proportions of acetone to give substantially pure 2,9α-difluoro - 11β,17α,21 - trihydroxy-4,6-pregnadiene-3,20-dione 21-acetate.

EXAMPLE 9

*2,9α-difluoro-17α,21-dihydroxy-4,6-pregnadiene-3,,11,20-trione 21-acetate*

A solution of fifty milligrams of 2,9α-difluoro-11β,17α, 21 - trihydroxy - 4,6-pregnadiene-3,20-dione 21-acetate, twenty milligrams of chromic anhydride and one drop of water in one milliliter of acetic acid was shaken several times at room temperature and allowed to stand for four hours. Thereafter it was poured into ten milliliters of water and refrigerated for twenty hours at about five degrees centigrade. The steroid which separated from the aqueous mixture was collected on filter paper and dried to give 2,9α-difluoro-17α,21-dihydroxy-4,6-pregnadiene-3,11,20-trione 21-acetate.

Oxidizing 2-chloro-9α-fluoro-11β,17α,21-trihydroxy-4,6-pregnadiene-3,20-dione 21-acetate with chromic anhydride in the manner shown in Example 9 produces 2-chloro-9α-fluoro - 17α,21-dihydroxy-4,6-pregnadiene-3,11,20-trione 21-acetate.

EXAMPLE 10

*2,9α-difluoro-11β,17α,21-trihydroxy-4,6-pregnadiene-3,20-dione*

100 milligrams of 2,9α-difluoro-11β,17α,21-trihydroxy-4,6-pregnadiene-3,20-dione 21-acetate were dissolved in a solution consisting of two milliliters of methanol and 0.1 milliliter of water, previously purged of air-oxygen by passing nitrogen through it, and to the resulting solution was added fifty milligrams of potassium carbonate. The mixture was allowed to stand at room temperature for a period of six hours in a nitrogen atmosphere, thereupon neutralized with five percent aqueous hydrochloric acid solution, diluted with five milliliters of water and refrigerated. The mixture was then filtered and the solids recrystallized from acetone-Skellysolve B hexanes to give pure 2,9α-difluoro-11β,17α,21-trihydroxy-4,6-pregnadiene-3,20-dione.

In the manner given in Example 10, hydrolyzing 2,9α-difluoro - 17α,21 - dihydroxy-4,6-pregnadiene-3,11,20-trione 21-acetate with potassium hydroxide in methanol yielded the 2,9α - difluoro-17α,21-dihydroxy-4,6-pregnadiene-3,11,20-trione.

EXAMPLE 11

*2,9α-difluoro-11β,17α,21-trihydroxy-4,6-pregnadiene-3,20-dione 21-propionate*

A solution was prepared containing fifty milligrams of 2,9α-difluoro-11β,17α,21-trihydroxy-4,6-pregnadiene-3,20-dione in one milliter of pyridine and one milliliter of propionic anhydride. The solution was allowed to stand at room temperature for a period of 21 hours and was thereupon poured into ten milliliters of water. The reaction mixture was then extracted with three 10-milliliter portions of methylene chloride. The methylene chloride extracts were combined, washed with water, dried over anhydrous sodium sulfate and evaporated to give a residue of 2,9α - difluoro-11β,17α,21-trihydroxy-4,6-pregnadiene-3,20-dione 21-propionate. Similarly, 2,9α-difluoro-11β,17α,21-trihydroxy-4,6-pregnadiene-3,20-dione is converted to other 2,9α-difluoro-11β,17α,21-trihydroxy-4,6-pregnadiene-3,20-dione 21-acylates by esterification of the 21-hydroxy group, e.g., by reaction with the appropriate acid chloride or bromide, anhydride, ester under ester exchange conditions or acid under esterification conditions. Examples of these compounds thus prepared include those wherein the acyl radical of the 21-acylate group is that of, for example, a lower-aliphatic acid, e.g., formic, propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylidene-acetic, cyclopentylformic, cyclopentylacetic, β-cyclopentylpropionic, cyclohexylformic, cyclohexylacetic, β-cyclohexylpropionic, an aryl or alkaryl acid, e.g., benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, an aralkyl acid, e.g., phenylacetic, phenylpropionic, diphenylacetic, triphenylacetic, etc.

EXAMPLE 12

2-fluoro-11β,17α,21-trihydroxy-4,6-pregnadiene-3,20-dione 21-methanesulfonate

A solution was prepared containing one gram (2.65 millimoles) of 2-fluoro-11β,17α,21-trihydroxy-4,6-pregnadiene-3,20-dione in seven milliliters of pyridine. This solution was cooled to zero degrees centigrade and treated with 0.3 milliter of methanesulfonyl chloride. Thereafter the solution was allowed to stand at zero to five degrees centigrade for a period of two hours, after which it was diluted with water and extracted with three 25-milliliter portions of methylene chloride. The extracts were combined, washed with cold dilute hydrochloric acid until the aqueous layer had a pH of two to three, then washed again with cold sodium bicarbonate solution, water and finally dried over anhydrous sodium sulfate. Evaporation of the methylene chloride extract at reduced pressure left a residue of 2-fluoro-11β,17α,21-trihydroxy-4,6-pregnadiene-3,20-dione 21-methanesulfonate.

EXAMPLE 13

2-fluoro-11β,17α-dihydroxy-21-iodo-4,6-pregnadiene-3,20-dione

The crude 2-fluoro-11β,17α,21-trihydroxy-4,6-pregnadiene-3,20-dione 21-methanseulfonate described in Example 12 was dissolved in fifteen milliliters of acetone and treated with a solution of one gram of sodium iodide in ten milliliters of acetone. The mixture was heated under reflux with stirring for a period of fifteen minutes, the heat then reduced and the mixture concentrated to one-third volume at reduced pressure. Ice and water were added and the precipitated product collected on a filter, washed with water and dried to yield 2-fluoro-11β,17α-dihydroxy-21-iodo-4,6-pregnadiene-3,20-dione.

EXAMPLE 14

2,21-difluoro-11β,17α-dihydroxy-4,6-pregnadiene-3,20-dione

One gram of 2-fluoro-11β,17α-dihydroxy-21-iodo-4,6-pregnadiene-3,20-dione was dissolved in 150 milliliters of boiling acetonitrile. After cooling to forty degrees centigrade, the solution was protected from light and 0.8 milliliter of a fifty percent aqueous solution of silver fluoride was added under stirring. Stirring was continued for one hour at about forty degrees centigrade, then 0.7 milliliter of silver fluoride solution was added. After another hour of stirring another 0.7 milliliter portion of aqueous silver fluoride solution was added. Heating and stirring was then continued for a period of two hours. The brown mixture was then filtered through a bed of diatomaceous earth (Celite) and the filtrate evaporated at reduced pressure at a bath temperature of fifty degrees centigrade. The brown residue was thoroughly extracted with two 100-milliliter portions of warm methylene chloride, the combined extracts washed with water and dried over anhydrous sodium sulfate. The dried solution was concentrated to approximately 100 milliliters and then chromatographed over fifty grams of magnesium silicate (Florisil). The column was eluted with hexanes containing increasing proportions of acetone to give 2,21-difluoro-11β,17α-dihydroxy-4,6-pregnadiene-3,20-dione.

In the same manner as given in Examples 12 to 14, 2,9α - difluoro - 11β,17α,21-trihydroxy-4,6-pregnadiene-3,20-dione was converted to 2,9α,21-trifluoro-11β,17α-dihydroxy-4,6-pregnadiene-3,20-dione.

EXAMPLE 15

2,21-difluoro-11β,17α-dihydroxy-4,6-pregnadiene-3,20-dione

A solution of one gram of 2-fluoro-11β,17α,21-trihydroxy - 4,6 - pregnadiene-3,20-dione 21-methanesulfonate and 0.50 gram of anhydrous potassium fluoride in ten milliliters of dimethylsulfoxide was heated at 100 degrees centigrade for twelve hours. The cooled solution was diluted with water and then extracted with methylene chloride which was dried and chromatographed in the manner described in Example 14 to give substantially pure 2,21-difluoro-11β,17α-dihydroxy-4,6-pregnadiene-3,20-dione.

EXAMPLE 16

2,21-difluoro-17α-hydroxy-4-pregnene-3,11,20-trione

A solution was prepared containing 0.5 gram of 2,21-difluoro-11β,17α-dihydroxy-4,6-pregnadiene-3,20 - dione, 0.15 gram of chromic acid, ten milliliters of glacial acetic acid and one-half milliliter of water. This mixture was stirred and then maintained for eight hours at room temperature. Thereafter the mixture was poured into fifty milliliters of ice water, neutralized by the addition of dilute sodium hydroxide and the thus-obtained precipitate collected on a filter and recrystallized three times from a mixture of ethyl acetate and Skellysolve B hexanes to give 2,21-difluoro-17α-hydroxy-4,6-pregnadiene-3,11,20-trione.

In the same manner given in Example 16, 2,9α,21-trifluoro-11β,17α - dihydroxy - 4,6-pregnadiene-3,20-dione was oxidized to 2,9α,21-trifluoro-17α-hydroxy-4,6-pregnadiene-3,11,20-trione.

EXAMPLE 17

2-fluoro-11β,17α-dihydroxy-4,6-pregnadiene-3,20-dione 150 milligrams of 2-fluoro-11β,17α-dihydroxy-21-iodo-4,6-pregnadiene-3,20-dione was slurried with five milliliters of acetic acid and stirred for a period of 45 minutes. Then an aqueous solution of 250 milligrams of sodium thiosulfate pentahydrate was added causing the iodine color to disappear. Additional water was added (fifty milliliters) and the mixture extracted with three 25-milliliter portions of methylene chloride. The methylene chloride extracts were combined, washed with water and cold sodium bicarbonate solution until all acetic acid was neutralized. After drying over anhydrous sodium sulfate, the solution was concentrated to approximately fifteen milliliters and chromatographed over ten grams of magnesium silicate (Florisil). The column was developed with hexanes containing increasing proportions of acetone, to give substantially pure 2-fluoro-11β,17α-dihydroxy-4,6-pregnadiene-3,20-dione.

Following the procedure of Example 17, 2,9α-difluoro-11β,17α-dihydroxy-21-iodo - 4,6 - pregnadiene-3,20-dione was converted to 2,9α-difluoro-11β,17α-dihydroxy-4,6-pregnadiene-3,20-dione.

EXAMPLE 18

*2-fluoro-17α-hydroxy-4,6-pregnadiene-3,11,20-trione*

A mixture was prepared containing 0.3 gram of 2-fluoro-11β,17α-dihydroxy - 4,6 - pregnadiene-3,20-dione, 100 milligrams of chromic anhydride, ten milliliters of glacial acetic acid and one-half milliliters of water. This mixture was stirred and thereupon maintained for eight hours at room temperature. Thereafter the mixture was poured into fifty milliliters of ice water, neutralized by the addition of dilute sodium hydroxide and the thus-obtained precipitate collected on a filter and dried to give 2-fluoro-17α-hydroxy-4,6-pregnadiene-3,11,20-trione.

Following the procedure of Example 18, 2, 9α-difluoro-11β,17α-dihydroxy-4,6-pregnadiene-3,20-dione was oxidized to 2,9α-difluoro-17α - hydroxy - 4,6-pregnadiene-3,11,20-trione.

An alternative method of producing the compounds of the present invention (VII–XXI), involves substituting the corresponding $C_6$-saturated compound, i.e., the corresponding $\Delta^4$ compound, as the starting compound in each of the reactions described in Examples 2 to 18, thus producing the corresponding $C_6$-saturated reaction products. These compounds can each be reacted with chloranil in the manner described in Example 1 to produce the corresponding $\Delta^{4,6}$ compounds (VII–XXI).

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound selected from the group consisting of (1) 2α - fluoro-17α,21-dihydroxy-4,6-pregnadiene-3,20-dione represented by the following formula:

wherein X is selected from the group consisting of halogen and hydrogen atoms, and R is selected from the group consisting of β-hydroxy and keto, and (2) 21-esters thereof of hydrocarbon carboxylic acids containing from one to twelve carbon atoms, inclusive.

2. 2α - fluoro - 17α,21 - dihydroxy - 4,6 - pregnadiene-3,11,20-trione.

3. 2α - fluoro - 11β,17α,21-trihydroxy-4,6-pregnadiene-3,20-dione.

4. 2α - fluoro - 11β,17α,21-trihydroxy-4,6-pregnadiene-3,20-dione 21-acylates wherein the acyl radical is that of a hydrocarbon carboxylic acid containing from one to twelve carbon atoms, inclusive.

5. 2α - fluoro - 11β,17α,21-trihydroxy-4,6-pregnadiene-3,20-dione 21-acetate.

6. 2α - fluoro - 17α,21 - dihydroxy - 4,6 - pregnadiene-3,11,20-trione 21-acylates wherein the acyl radical is that of a hydrocarbon carboxylic acid containing from one to twelve carbon atoms, inclusive.

7. 2α - fluoro - 17α,21 - dihydroxy - 4,6-pregnadiene-3,11,20-trione 21-acetate.

8. 2α,9α - difluoro - 11β,17α,21 - trihydroxy - 4,6-pregnadiene-3,20-dione 21-acylates wherein the acyl radical is that of a hydrocarbon carboxylic acid containing from one to twelve carbon atoms, inclusive.

9. 2α,9α - difluoro - 11β,17α,21 - trihydroxy - 4,6-pregnadiene-3,20-dione 21-acetate.

10. 2α,9α - difluoro-17α,21-dihydroxy-4,6-pregnadiene-3,11,20-trione 21-acylates wherein the acyl radical is that of a hydrocarbon carboxylic acid containing from one to twelve carbon atoms, inclusive.

11. 2α,9α - difluoro-17α,21-dihydroxy-4,6-pregnadiene-3,11,20-trione 21-acetate.

12. 2α,9α - difluoro - 11β,17α,21 - trihydroxy - 4,6-pregnadiene-3,20-dione.

13. 2α,9α - difluoro-17α,21-dihydroxy-4,6-pregnadiene-3,11,20-trione.

14. A 2α,21 - difluoro-17α-hydroxy-4,6-pregnadiene-3,20-dione represented by the formula:

wherein X is selected from the group consisting of chlorine, fluorine and hydrogen atoms and R is selected from the group consisting of β-hydroxy and keto.

15. 2α,21 - difluoro-11β,17α-dihydroxy-4,6-pregnadiene-3,20-dione.

16. A 2α - fluoro - 17α - hydroxy-4,6-pregnadiene-3,20-dione represented by the formula:

wherein X is selected from the group consisting of chlorine, fluorine and hydrogen atoms and R is selected from the group consisting of β-hydroxy and keto.

17. 2α - fluoro - 11β,17α - dihydroxy-4,6-pregnadiene-3,20-dione.

References Cited in the file of this patent

UNITED STATES PATENTS

| | | |
|---|---|---|
| 2,697,106 | Shepherd et al. | Dec. 14, 1954 |
| 2,738,348 | Cotton | Mar. 13, 1956 |